April 17, 1962 F. W. ROBERTS 3,029,656

BELT RECORD DRIVE MECHANISM

Filed May 9, 1960

INVENTOR.
FREDERICH W. ROBERTS
BY
Curtis, Morris & Safford
ATTORNEYS 3,029,656
Patented Apr. 17, 1962

1

3,029,656
BELT RECORD DRIVE MECHANISM

Frederick W. Roberts, Fairfield, Conn., assignor to Dictaphone Corporation, Bridgeport, Conn., a corporation of New York Filed May 9, 1960, Ser. No. 27,818
4 Claims. (Cl. 74—241)

Figures 1, 2, 3:
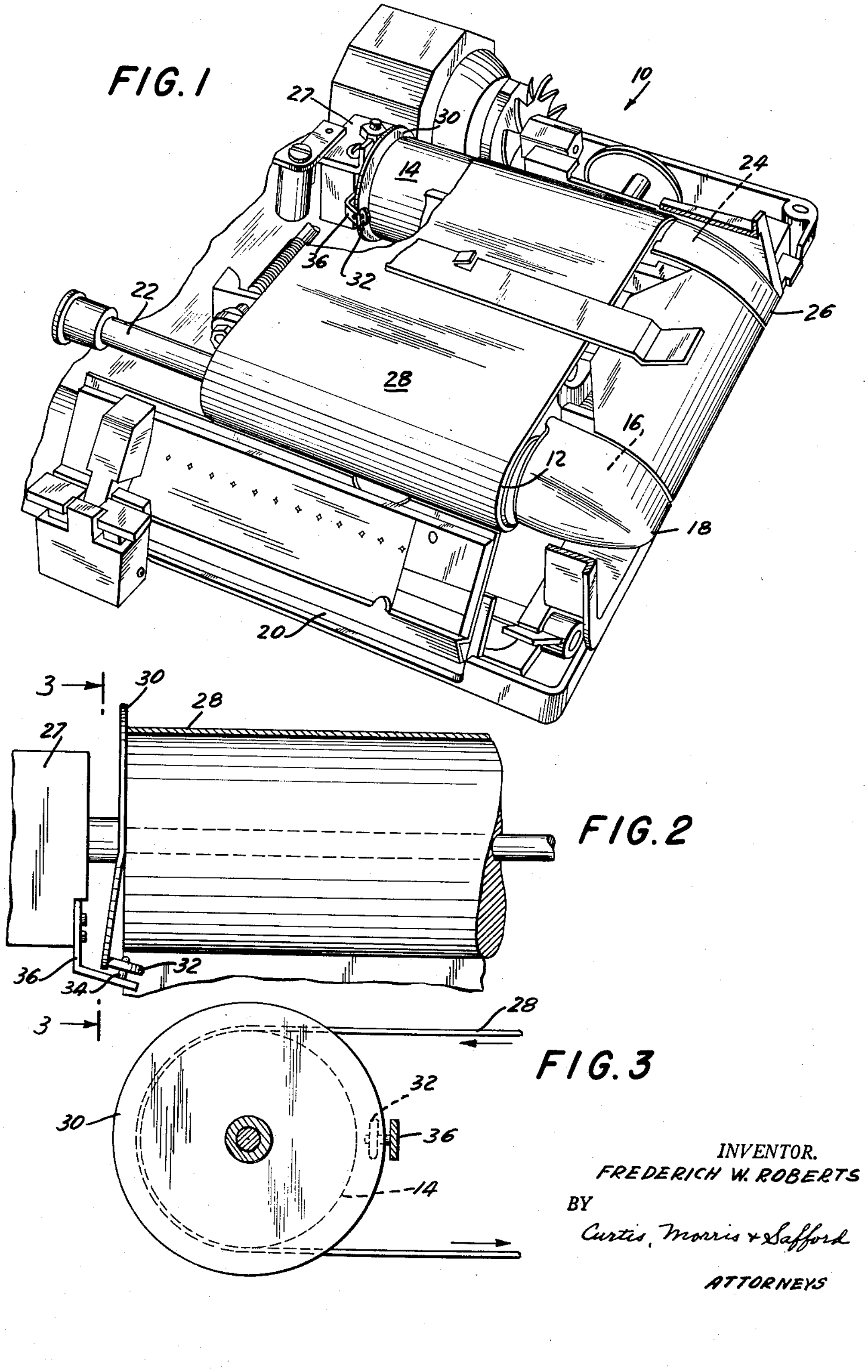

This invention relates to an improved mandrel and flange arrangement for supporting and driving a belt-record in a dictating machine and the like.

An object of the invention is to provide a dual-mandrel mechanism for supporting and driving a belt-record in a dictating machine and the like so that the record can be played a great many times without fraying or wearing its edge.

Another object is to provide such a mechanism which is simple, reliable and inexpensive.

These and other objects will in part be understood from and in part pointed out in the description given hereinafter.

In a dictating machine, such as described in U.S. application Serial No. 728,646, there is a pair of small diameter mandrels spaced generally parallel to each other for supporting and driving a short, wide belt record past a recording head and a playback head. To insure that the record is accurately positioned with respect to these heads, the inner side edge of the record is indexed against a radial flange on one end of one of the mandrels, the mandrels being arranged slightly non-parallel to each other so that this edge of the record continuously rides against the flange when the mandrels are rotated. Now, it has been found that in a record-driving arrangement of this kind, the adjustment of the mandrels to keep the record properly indexed against the flange has to be carefully made. If the adjustment is improper or if it changes during use, the record edge may not make contact with the flange thus possibly distorting or destroying a portion of the sound track on the record. Conversely, if the record edge bears against the flange with too much force, the edge quickly wears or frays, moreover, there is an unpleasant scraping noise. Even when the mandrels are properly adjusted, where the same record will be played or re-recorded a great number of times, this edge wear becomes severe and gives rise to improper indexing of the record on the mandrels. The present invention effectively eliminates these difficulties.

In accordance with the present invention wearing of the edge of a belt-record in a dual-mandrel arrangement as described above is effectively eliminated by causing the index flange on one of the mandrels to make contact with the record only where record and flange do not move relative to each other. Thus, there can be no wear of the record edge regardless of how often the record is played, but yet the indexing function of the flange is retained. It has been found that by virtue of this arrangement belt-record life is increased ten to thirty times.

In one specific embodiment of the invention, the mandrel flange is made in the form of a flexible metal disk fastened to one end of one of the mandrels. Then the disk is continuously bent away from the edge of the record where it would otherwise normally make contact with it with a rubbing motion, the disk being allowed to touch the record edge and index it only where there is no relative motion.

A better understanding of the inveniton together with a fuller appreciation of its many advantages will best be gained from the following description given in connection with the accompanying drawings wherein:

FIGURE 1 is a perspective view of a dual mandrel belt-record driving mechanism embodying the invention;

2

FIGURE 2 is an enlarged plan view of a portion of FIGURE 1 showing the flexible disk flange; and FIGURE 3 is a view taken as indicated by lines 3—3 in FIGURE 2.

The belt-record mechanism 10 seen in FIGURE 1 comprises a forward drive mandrel 12 and a rear idler mandrel 14 spaced generally parallel to it. The right end of forward mandrel 12 is rotatably journalled in a bearing 16 (not shown) recessed within a stationary guide shoe 18 mounted on a frame or base 20. Mandrel 12 is adapted to be rotated at constant speed by a shaft 22 extending to a drive connection (not shown) but which can be identical to that shown in application No. 728,646. Rear mandrel 14, similarly, at its right end is journalled in a laterally shiftable bearing 24 (not shown) inside another guide shoe 26. The left end of this rear mandrel is carried in a similar shiftable bearing 27, this end bearing 27 being movable in unison with end bearing 24 to shift mandrel 14 closer to or farther from front mandrel 12 and thereby permit the insertion upon or removal from the mandrels of a belt record 28. A detailed description of this operation and of the elements associated with mandrels 12 and 14 not described herein and not forming part of the present invention will be found in the aforesaid application No. 728,646.

Mounted on the left end of rear mandrel 14, as seen also in FIGURES 2 and 3, is an index flange 30 which is a thin disk of flexible metal or the like. This disk, which serves to index a record laterally on the mandrels, is concentric with and has a diameter greater than that of mandrel 14. Forward of this mandrel and between the upper and lower runs of a belt-record, this disk 30 is engaged by a small wheel 32. This wheel 32 bends the disk away from the mandrel in the regions where the edge of the belt-record would normally rub against a flange having a planar face perpendicular to mandrel 14. However, the rearward portion of disk 30 remains in contact with the end of the mandrel and undeflected, thus accurately positioning the edge of the record relative to the mandrel. Since there is no movement of the record edge relative to this rear portion of the flange, even when the mandrel rotates, there is no wear.

Wheel 32 is rotatably mounted on a pin 34 carried on the outer end of a bracket 36, the inner end of the bracket being fastened onto the housing of bearing 27 and movable with it. Wheel 32 and bracket 36 are positioned in the space between the upper and lower flights of the belt record mounted on the mandrels and thus do not interfere with it.

The above description is intended in illustration and not in limitation of the invention. Various minor changes may occur to those skilled in the art and may be made without departing from the spirit or scope of the invention as set forth.

I claim:

1. An improved mechanism for indexing and driving a belt-record past a recording or reproducing head, said mechanism including at least one small diameter mandrel for supporting said record cylindrically curved around the rear half of said mandrel, and a flange on the inner end of said mandrel for indexing said record, said flange being movable relative to said mandrel, the forward portion of said flange being continuously held out of contact with the edge of said record.

2. The mechanism as in claim 1 wherein said flange is a thin disk of bendable resilient material, and is held out of contact with said record edge by a small wheel rolling in contact with said flange.

3. A dual-mandrel mechanism for supporting and driving a belt-record, said mechanism including two cylindrical mandrels mounted generally parallel to each other on a machine frame, to support a record looped over and stretched between them, an index flange on the inner end of one of said mandrels against which the inner edge of a belt-record abuts, and means for continuously skewing said flange out of parallel with said record edge so that the portion of said flange between said mandrels is out of contact with said record edge.

4. The mechanism as in claim 3 wherein said flange is a bendable disk, and said means includes a small wheel between said mandrels for bending said flange away from said record edge.

References Cited in the file of this patent

UNITED STATES PATENTS

| | | |
|---|---|---|
| 2,096,113 | Kiel | Oct. 19, 1937 |

FOREIGN PATENTS

| | | |
|---|---|---|
| 616,947 | Great Britain | Jan. 28, 1949 |